US011692435B2

(12) United States Patent
Leblanc et al.

(10) Patent No.: US 11,692,435 B2
(45) Date of Patent: Jul. 4, 2023

(54) TRACKING CEMENTING PLUG POSITION DURING CEMENTING OPERATIONS

(71) Applicant: HALLIBURTON ENERGY SERVICES, INC., Houston, TX (US)

(72) Inventors: Michel Joseph Leblanc, Houston, TX (US); John Laureto Maida, Jr., Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 77 days.

(21) Appl. No.: 17/103,773

(22) Filed: Nov. 24, 2020

(65) Prior Publication Data
US 2021/0238987 A1  Aug. 5, 2021

Related U.S. Application Data

(60) Provisional application No. 62/968,998, filed on Jan. 31, 2020.

(51) Int. Cl.
*E21B 47/09* (2012.01)
*E21B 33/12* (2006.01)
(Continued)

(52) U.S. Cl.
CPC .............. *E21B 47/09* (2013.01); *E21B 33/12* (2013.01); *G01B 11/22* (2013.01); *G01D 5/353* (2013.01);
(Continued)

(58) Field of Classification Search
CPC ........ E21B 47/09; E21B 33/12; E21B 47/135; E21B 23/08; G01B 11/22; G01B 7/026;
(Continued)

(56) References Cited

U.S. PATENT DOCUMENTS 2,838,116 A   6/1958  Clark, Jr. et al.
3,250,330 A   5/1966  Smith, Jr.
(Continued)

FOREIGN PATENT DOCUMENTS

EP  3263832 A1  1/2018
GB  2328968 A   3/1999
(Continued)

OTHER PUBLICATIONS

Johnson, D.O., et al., Society of Petroleum Engineers (SPE) Paper # 77460, "Identification of Steam Breakthrough Intervals Using DTS Technology," Sep. 2002.
(Continued)

*Primary Examiner* — Jonathan M Hansen
(74) *Attorney, Agent, or Firm* — Novak Druce Carroll LLP

(57) ABSTRACT

Aspects of the subject technology relate to systems and methods for determining positions of cementing plugs during a cementing process. Systems and methods are provided for determining a length of an optical fiber line deployed into a wellbore for a cementing process, measuring signal intensity data as a function of distance from the optical fiber line, the optical fiber line being attached to a lower cementing plug and an upper cementing plug, the upper cementing plug being attached to the optical fiber line by an attenuation assembly, generating signal intensity profiles based on the signal intensity data as a function of a round trip delay of a light signal in the optical fiber line, and determining positions of the lower cementing plug and the upper cementing plug based on the signal intensity profiles of the optical fiber line.

20 Claims, 6 Drawing Sheets

(51) Int. Cl.
   *G01B 11/22*    (2006.01)
   *H04B 10/071*   (2013.01)
   *G01D 5/353*    (2006.01)

(52) U.S. Cl.
   CPC ....... *G01D 5/3537* (2013.01); *G01D 5/35374* (2013.01); *H04B 10/071* (2013.01)

(58) Field of Classification Search
   CPC ...... G01B 11/18; G01D 5/353; G01D 5/3537; G01D 5/35374
   See application file for complete search history.

(56)          References Cited

U.S. PATENT DOCUMENTS

| | | | |
|---|---|---|---|
| RE27,459 E | | 8/1972 | Guinn et al. |
| 4,832,121 A | | 5/1989 | Anderson |
| 5,275,038 A | | 1/1994 | Sizer et al. |
| 5,375,661 A | | 12/1994 | Daneshy et al. |
| 5,892,176 A | | 4/1999 | Findlay et al. |
| 5,996,689 A | | 12/1999 | Head |
| 6,268,911 B1 | | 7/2001 | Tubel et al. |
| 6,367,548 B1 | | 4/2002 | Purvis et al. |
| 6,531,694 B2 | | 3/2003 | Tubel et al. |
| 6,532,839 B1 | | 3/2003 | Kluth et al. |
| 7,055,604 B2 * | | 6/2006 | Jee .......................... E21B 43/26 166/305.1 |
| 7,448,448 B2 * | | 11/2008 | Lovell ..................... E21B 43/25 166/305.1 |
| 7,617,873 B2 * | | 11/2009 | Lovell ................... E21B 34/066 166/305.1 |
| 9,222,349 B2 | | 12/2015 | Leblanc |
| 9,708,867 B2 | | 7/2017 | Lovell et al. |
| 2002/0007945 A1 | | 1/2002 | Neuroth et al. |
| 2002/0157828 A1 | | 10/2002 | King |
| 2007/0165691 A1 * | | 7/2007 | Taverner ................ G01K 11/32 374/E11.015 |
| 2012/0085531 A1 | | 4/2012 | Leising et al. |
| 2014/0034301 A1 * | | 2/2014 | Leblanc .................. E21B 33/16 166/250.14 |

FOREIGN PATENT DOCUMENTS

| | | |
|---|---|---|
| WO | 2002057805 A2 | 7/2002 |
| WO | 2004018840 A1 | 3/2004 |
| WO | 2016186612 A1 | 11/2016 |

OTHER PUBLICATIONS

Fryer, V., et al., Society of Petroleum Engineers (SPE) Paper # 92962, "Monitoring of Real-Time Temperature Profiles Across Multizone Reservoirs During Production and Shut-In Periods Using Permanent Fiber-Optic Distributed Temperature Systems," Apr. 2005.

Economides, M.J., "a practical companion to reservoir stimulation," Developments in Petroleum Science, vol. 34, 1992.

Economides, M.J. et al., "Reservoir Stimulation," Second Edition, 1989.

Smith, Robert, et al., Society of Petroleum Engineers (SPE) Paper # 2686, "Computer Study of Factors Affecting Temperature Profiles in Water Injection Wells," Journal of Petroleum Engineering, p. 1447, Nov. 1970.

Rajah, Benny, et al., Society of Petroleum Engineers (SPE) Paper #29290, "Experiences and Results of Acid Prepacking and Gravelpacking Wells in the West Luton Field in Sarawak, Malaysia," Mar. 1995.

Wehunt, Jr., C.D., Society of Petroleum Engineers (SPE) Paper # 20137, "Evaluation of Alternating Phase Fracture Acidizing Treatment Using Measured Bottomhole Pressure," Mar. 1990.

Nelson, R.L., et al., Society of Petroleum Engineers (SPE) Paper# 39943, "Multiple Pad-Acid Fracs in a Deep Horizontal Well," Apr. 1998.

Krawietz, T.E., et al., Society of Petroleum Engineers (SPE) Paper # 27809, "Horizontal Well Acidizing of a Carbonate Formation: A Case History of Lisburne Treatments, Prudhoe Bay, Alaska," Nov. 1996.

International Search Report and Written Opinion, PCT Application No. PCT/US2020/062697, dated Mar. 16, 2021.

* cited by examiner

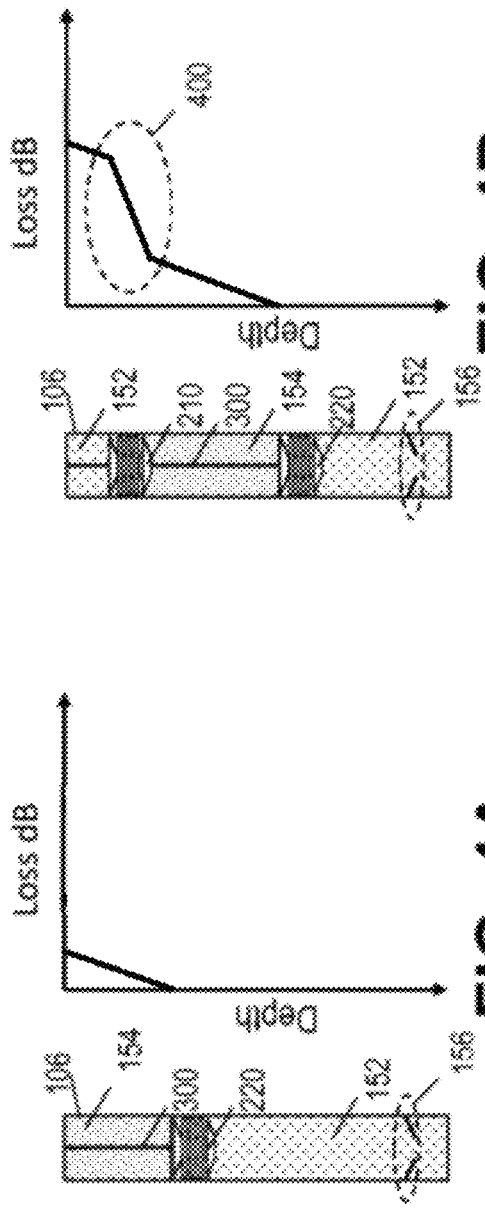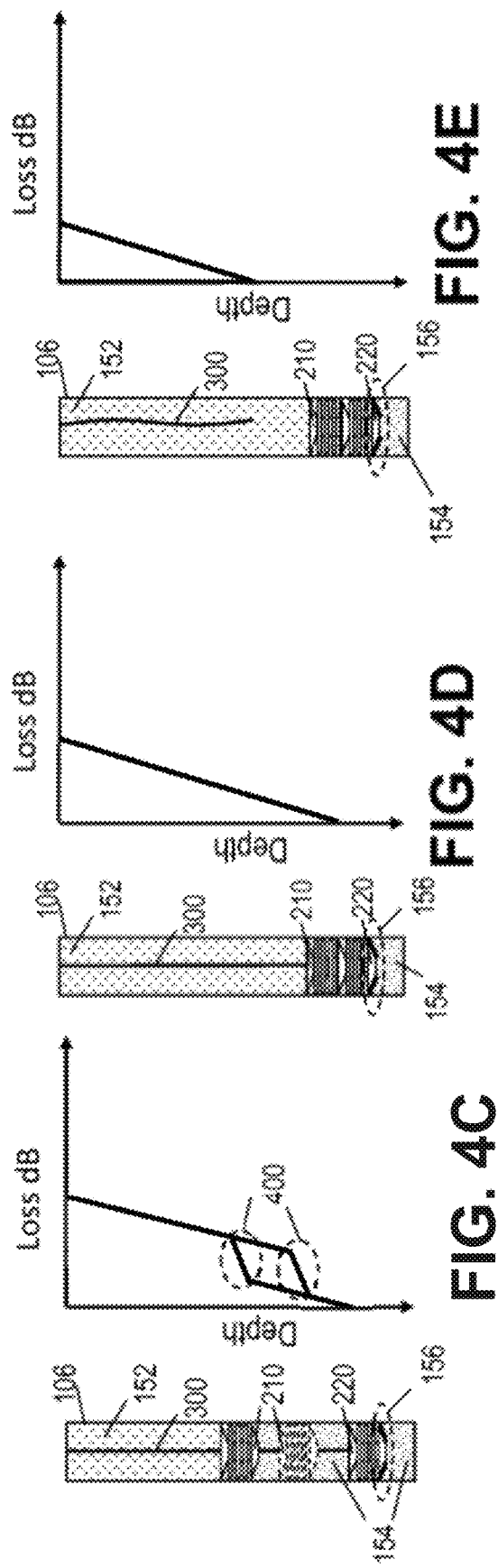

TRACKING CEMENTING PLUG POSITION DURING CEMENTING OPERATIONS

CROSS-REFERENCE TO RELATED APPLICATIONS

This application claims priority to U.S. Provisional Patent Application No. 62/968,998, filed on Jan. 31, 2020, entitled "TRACKING CEMENTING PLUG POSITION DURING CEMENTING OPERATION USING OPTICAL TIME-DOMAIN REFLECTOMETRY," the contents of which are incorporated herein by reference in their entirety.

TECHNICAL FIELD

The present technology pertains to a cementing process, and more particularly, to determining positions of cementing plugs during the cementing process.

BACKGROUND

During a cementing job, tools known as cementing plugs are frequently run to separate the cement from spacer fluids or the cement from drilling mud. Those tools are intended to prevent the contamination of the cement, serve as sweeper to remove drilling mud material from the inner surface of the coating, and help properly position the cement. Usually, two plugs, one at the bottom of cement, the other at the top of cement are sent. It is desirable to know the exact position of these plugs to confirm their correct deployment. For example, if the separation is imperfect and the volume of cement becomes contaminated during the run, the volume, and therefore the distance between the two plugs, will be larger than the value intended.

Currently, the position of the plugs is inferred by the volume of fluids pumped and by pressure increases. The increase of the pressure associated with the first plug reaching its intended position is only of a few hundred psi and can be missed at the surface. When this happens, one loses valuable information about the amount of cement between the two plugs. Other troubles that can happen in a well during a cementing job can also lead to misinterpretation of the pumped volume and pressure readings at the surface. For example, a plug can get stuck and cause a pressure increase similar to the plug having reached its position.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 4A-4E illustrate example power loss profiles during cementing operations in accordance with aspects of the present disclosure.

DETAILED DESCRIPTION

Figure 1:
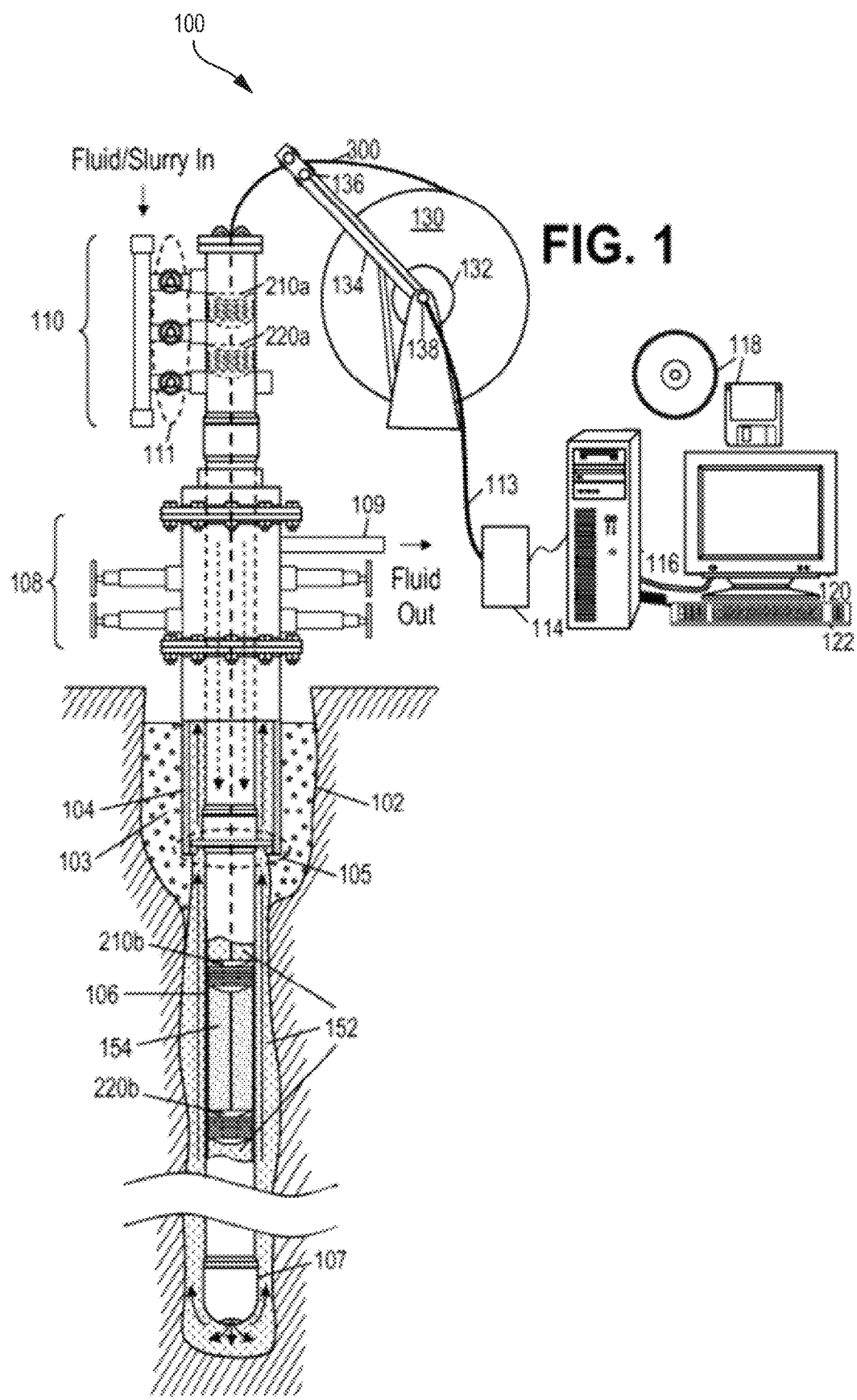
FIG. 1 illustrates an example borehole cementing system with plug tracking in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As wells are drilled to greater lengths and depths, it becomes necessary to provide a liner ("casing") to avoid undesirable fluid inflows or outflows and to prevent borehole collapse. The annular space between the borehole wall and the liner is usually filled with cement (a process referred to as "cementing" the well) to reinforce structural integrity and to prevent fluid flows along the outside of the liner. If such fluid flows are not prevented, there is a loss of zonal isolation. Fluids from high-pressured formations can enter the borehole and travel along the outside of the casing to invade lower-pressured formations, or possibly exit the borehole in a mixture that dilutes the desired production fluid. Results may include contamination of aquifers, damage to the hydrocarbon reservoir, and loss of well profitability.

When cementing a well, the cement is generally injected down the interior of the casing to the bottom of the borehole and forced back upward around the casing (also referred to as a forward cementing process). Tools referred to as cementing plugs are sometimes used to separate the cement from spacer fluids injected into the well. Spacer fluids are fluids used to separate and thus reduce contact and mixing between wellbore fluids (e.g., drilling fluid and cement). A lower plug is first inserted into the casing ahead of the cement to separate the cement from spacer fluid already injected into the well. Cement is then pumped into the casing behind the lower plug, which drives the lower plug down into the well. This forces fluid already in the borehole (e.g., spacer and drilling fluid) back up into the annular region between the casing and the formation and to the surface where it is safely collected.

Once the desired amount of cement has been injected into the casing, an upper plug is inserted into the casing, and spacer fluid is injected above the upper plug. The upper plug separates the spacer fluid from the cement, and the two plugs and the cement in between move downward as fluid is injected above the upper plug. As it moves downward, the lower plug wipes fluid and other materials from the inner surface of the casing in front of the cement, thus helping to reduce contamination of the cement. When the lower plug is stopped by a float collar near the bottom of the casing, pressure is increased until a diaphragm in the lower plug ruptures, allowing the cement to flow past the lower plug and float collar, into the bottom of the borehole and back up the annular region outside the casing. Although this puts the cement in contact with the spacer fluid on the other side of the lower plug, the formulation of the spacer fluid reduces the degree to which it mixes with and adversely affects the cement. The upper plug continues to be forced downward by the spacer fluid above it until the cement is forced out from between the two plugs and the upper plug lands on the lower plug. The cement is then left to cure before any further drilling or production activities continue.

As cementing proceeds, it is useful to know the position of each plug as it progresses down the casing in order to track the position of the cement itself. Many existing techniques rely on pressure variations in the fluid to identify the position of the plugs at a few key points during cementing, such as the pressure increase that occurs when the first plug arrives at the float collar. But such pressure variations are generally small enough to be easily missed on the surface (e.g., just a few hundred pounds per square inch). Furthermore, other events such as a stuck lower plug may also cause similar pressure increases that may incorrectly be interpreted as a plug reaching a key position. Existing techniques also do not track the distance between the upper and lower plugs (and thus the volume of cement between the plugs) as the plugs and cement travel through the casing. Changes in the cement volume can be indicative of a problem such as significant contamination of the cement. Such contamination can compromise the integrity of the cement, as well as the overall long-term safety of the well and those working around it.

The disclosed technology addresses the foregoing by determining cementing plug positions during a cementing process. In turn, positions of cementing plugs can be determined based on data received utilizing optical time-domain reflectometry or optical frequency-domain reflectometry during the cementing process in real-time.

In various embodiments, a method for determining a length of an optical fiber line deployed into a wellbore for a cementing process, measuring signal intensity data as a function of distance from the optical fiber line, the optical fiber line being attached to a lower cementing plug and an upper cementing plug, the upper cementing plug being attached to the optical fiber line by an attenuation assembly, generating signal intensity profiles based on the signal intensity data as a function of a round trip delay of a light signal in the optical fiber line, and determining positions of the lower cementing plug and the upper cementing plug based on the signal intensity profiles of the optical fiber line.

In various embodiments, a system for determining positions of fluids during a cementing process in real-time can include one or more processors; and at least one computer-readable storage medium having stored therein instructions which, when executed by the one or more processors, cause the system to determine a length of an optical fiber line deployed into a wellbore for a cementing process, measure signal intensity data as a function of distance from the optical fiber line, the optical fiber line being attached to a lower cementing plug and an upper cementing plug, the upper cementing plug being attached to the optical fiber line by an attenuation assembly, generate signal intensity profiles based on the signal intensity data as a function of a round trip delay of a light signal in the optical fiber line, and determine positions of the lower cementing plug and the upper cementing plug based on the signal intensity profiles of the optical fiber line.

In various embodiments, a non-transitory computer-readable storage medium comprising instructions stored on the non-transitory computer-readable storage medium, the instructions, when executed by one or more processors, cause the one or more processors to determine a length of an optical fiber line deployed into a wellbore for a cementing process, measure signal intensity data as a function of distance from the optical fiber line, the optical fiber line being attached to a lower cementing plug and an upper cementing plug, the upper cementing plug being attached to the optical fiber line by an attenuation assembly, generate signal intensity profiles based on the signal intensity data as a function of a round trip delay of a light signal in the optical fiber line, and determine positions of the lower cementing plug and the upper cementing plug based on the signal intensity profiles of the optical fiber line.

FIG. 1 illustrates an example borehole cementing system 100 with plug (e.g., cementing plugs 210, 220) tracking (e.g., with an optical time-domain reflectometer 114 (OTDR)) including a borehole 102 that has been drilled into the earth. Such boreholes 102 are routinely drilled to ten thousand feet or more in depth and can be steered horizontally for perhaps twice that distance. The borehole 102 shown is configured for cementing operations and can secure casing 106 within the borehole 102. Casing header 104, secured into place before the start of drilling operations by cement 103, provides the anchor point for the other components, including casing 106, blowout preventer (BOP) 108 and cementing head 110. Cementing head 110 couples to the top of casing 106, which passes through BOP 108 and is coupled to casing header 104 by casing hanger 105. Casing hanger 105 includes orifices that permit the passage of fluids. Fluids circulated through the borehole 102, including the cement slurry 154 used to cement the casing 106 into place, are injected into cementing head 110, down through casing 106 and cementing shoe 107 (coupled to the downhole end of casing 106), back up borehole 102 through the annulus between the exterior of casing 106 and the borehole wall, and out return line 109 of BOP 108.

In many cementing operations of borehole cementing system 100, particularly for sub-sea well, cementing plugs 210, 220 can be deployed using darts that are designed to be captured by the cementing plug 220 that is already positioned further down the flow path. Borehole cementing system 100 can also track the darts themselves, as well as combined dart-plug assemblies. Additionally, optical fiber line 300 (e.g., an optical sensing fiber line or a distributed sensing optical fiber line) of borehole cementing system 100 can be utilized by borehole cementing system 100 and can be a highly flexible, low cost micro-cable, a minimally-protected optical fiber, small diameter, high strength fiber optic cables, or a more robust, stiffer "slickline" cable. The "slickline" cable also can allow retrieval of temporary downhole tools.

In some implementations, borehole cementing system 100 can allow for direct, positive knowledge of bottom plug 220 position using two different measurement systems (e.g., counter and strain profiles) and the position of the top plug 210 using optical time-domain reflectometry measurements by optical time-domain reflectometer 114. For example, borehole cementing system 100 can utilize optical time-domain reflectometer 114 instead of strain sensing equipment, which is more expensive and not as commonly used in the fiber optic industry. In subsea systems, optical fiber line 300 can be attached to darts and not the plugs themselves. Moreover, the darts can be launched at the surface rig. As such, for sub-sea applications, borehole cementing system 100 offers retrievability for re-use.

Prior to initiating cementing operations with borehole cementing system 100, cementing plugs 210, 220 (shown in FIG. 1 in their pre-deployment configuration as upper cementing plug 210a and lower cementing plug 220a) are initially positioned relative to valves 111 of cementing head 110 so as to allow fluids to be directed ahead or behind each of the plugs. In the example shown, lower cementing plug 220a is positioned between lower and middle valves 111, and upper cementing plug 210a is positioned between upper and middle valves 111. Before the cementing plugs are deployed, lower valve 111 is opened and fluid is injected and circulated through borehole 102 to clear out residual cuttings and other debris. While drilling fluid may initially be used to clear the residual material, spacer fluid 152 is injected to either side of the cementing plugs to reduce any adverse effect that may be caused by mixing of spacer fluid 152 with the cement slurry 154.

Once debris has been cleared by the circulating fluid and spacer fluid 152 has been injected in front of lower cementing plug 220a, lower valve 111 is closed and the flow of spacer fluid is shut off. Middle valve 111 is then opened, lower cementing plug is configured for deployment (e.g., any locking pins are removed) and cement slurry 154 is injected into cementing head 110, pushing lower cementing plug 220a downhole through casing 106. The downhole movement of lower cementing plug 220a also triggers the deployment of optical fiber line 300, which is coupled to lower cementing plug 220a.

In the illustrative embodiment shown, the undeployed portion of optical fiber line 300 of borehole cementing system 100 is coiled onto reel 130 and positioned over the borehole by deployment arm 134 as it is deployed. Counter 136 at the end of deployment arm 134 tracks the length of optical fiber line 300 as it is deployed. Reel 130 also includes deployment controller 132 (e.g., an electric motor and/or frictional brakes) which applies a force to reel 130 that opposes the deployment of optical fiber line 300 and thus maintains tension on optical fiber line 300. Coupler 138 couples the sending end of optical fiber line 300 on the reel to interface cable 113 (e.g., via an optical slip ring), which couples to optical time-domain reflectometer 114. Interface cable 113, which in some embodiments includes both optical and electrical cables, also couples to counter 136 and deployment controller 132, enabling these components to be monitored and/or controlled, as applicable.

Optical time-domain reflectometer (OTDR) or optical frequency domain reflectometer (OFDR) 114 of borehole cementing system 100 can also supply laser light pulses (e.g., utilizing OTDR) or wavelength-swept/amplitude-modulated (e.g., utilizing OFDR) laser light to a cable (e.g., optical fiber line 300) and analyze returned signals (e.g., optical backscatter signal intensity attenuation, frequency shift, or wavelength shift) to perform distributed sensing of one or more parameters along the length of optical fiber line 300, including optical fiber signal intensity attenuation/loss, strain, and/or temperature. For example, optical time-domain reflectometer 114 of borehole cementing system 100 can measure and detect changes in signal intensity loss in dB. The light pulses from optical time-domain reflectometer 114 can pass through the fiber and produce one or more parameter-dependent optical backscatter phenomena. Such phenomena include Rayleigh, Brillouin and Raman backscattering of light. Typical silica-based optical fiber waveguides are sensitive to physical bending, material density, and length changes which, for appropriately configured fibers, are indicative of signal intensity (e.g., loss in dB), temperature, or other parameters that vary in response to environmental conditions. In addition to elastic Rayleigh backscatter signal intensity loss, such physical variations (or perturbations) of the optical fiber may also modulate the inelastically scattered photons within the fiber (e.g., Raman or Brillouin scattering), providing detectable variations in the backscattered intensity of wavelength shifted light and/or optical phonon frequency shifts, respectively. In some implementations, if optical fiber line 300 is deformed locally by a bending or deformation apparatus (e.g., attenuation assembly 214), use of an OTDR or OFDR 114 allows for the detecting and ranging of any deformation, as a reduction of backscattered light intensity. In some cases, light intensity scattered from perturbation variations may increase backscattered light intensity. Backscattered intensity loss caused by the translatable deformation apparatus (as described herein, e.g., attenuation assembly 214) within the wellbore may be adjustable to suit the particular optical fiber waveguide bend loss characteristics and may range from about 0.1 dB to several dB (or more) depending on the noise performance and signal measurement dynamic range of OTDR/OFDR 114.

To collect the measurements, optical time-domain reflectometer 114 of borehole cementing system 100 can feed tens of thousands of laser pulses each second into optical fiber line 300 and apply time gating to the reflected signals to collect parameter measurements at different points along the length of optical fiber line 300. Optical time-domain reflectometer 114 can process each measurement and combine it with other measurements for that point to obtain a high-resolution measurement of that parameter. In some implementations, optical time-domain reflectometer 114 can also be an optical frequency-domain reflectometer and be connected to optical fiber line 300 at the surface. Optical time-domain reflectometer 114 of borehole cementing system 100 can measure the total length of optical fiber line 300, its loss (e.g., backscatter intensity) profile, as well as the distance along optical fiber line 300 of any abrupt changes in optical fiber line 300 loss characteristics. Optical time-domain reflectometer 114 of borehole cementing system 100 can provide the ability to know with accuracy the length of optical fiber line 300 deployed in the well. For example, using physical length verifying counters mounted on reel 130 (e.g., a spool feed mechanism). Furthermore, borehole cementing system 100 can record data continuously during the cementing process. Optical time-domain reflectometer 114 of borehole cementing system 100 can also be subjected to a local attenuation at a fixed datum relative to the well head while allowing optical fiber line 300 to move relative to attenuation assembly 214 (e.g., an attenuation-causing device).

A general purpose data processing system 116 can periodically retrieve the measurements as a function of position and establish a time record of those measurements. Software (represented by information storage media 118) runs on the general purpose data processing system to collect the measurement data and organize it in a file or database. The software further responds to user input via a keyboard or other input mechanism 122 to display the measurement data as an image or movie on a monitor or other output mechanism 120. The software additionally monitors the deployment length of optical fiber line 300 and controls its tension via deployment controller 132 as the cementing plugs and the cement slurry 154 are deployed/injected into casing 106.

After the desired amount of cement slurry 154 has been injected, middle valve 111 of borehole cementing system 100 is closed and the flow of cement slurry 154 is shut off. Top valve 111 of borehole cementing system 100 is then opened, upper cementing plug 210a is configured for deployment and spacer fluid 152 is injected into cementing head 110, pushing the cementing plugs 210, 220 and the cement slurry 154 downhole through casing 106. FIG. 1 shows the cementing plugs 210, 220 in transit through casing 106 as upper cementing plug 210b and lower cementing plug 220b. These are the same cementing plugs (210a and 220a) shown within cementing header 110, but at a different point in time after deployment. Cement slurry 154 is shown in between the two cementing plugs 210, 220, as is spacer fluid 152 above upper cementing plug 210b, below lower cementing plug 220b and in the annulus between casing 106 and the borehole wall. Upper cementing plug 210a is slidably attached to optical fiber line 300 such that it can move along the length of optical fiber line 300 while still exerting a tensional force on optical fiber line 300.

Figure 2:
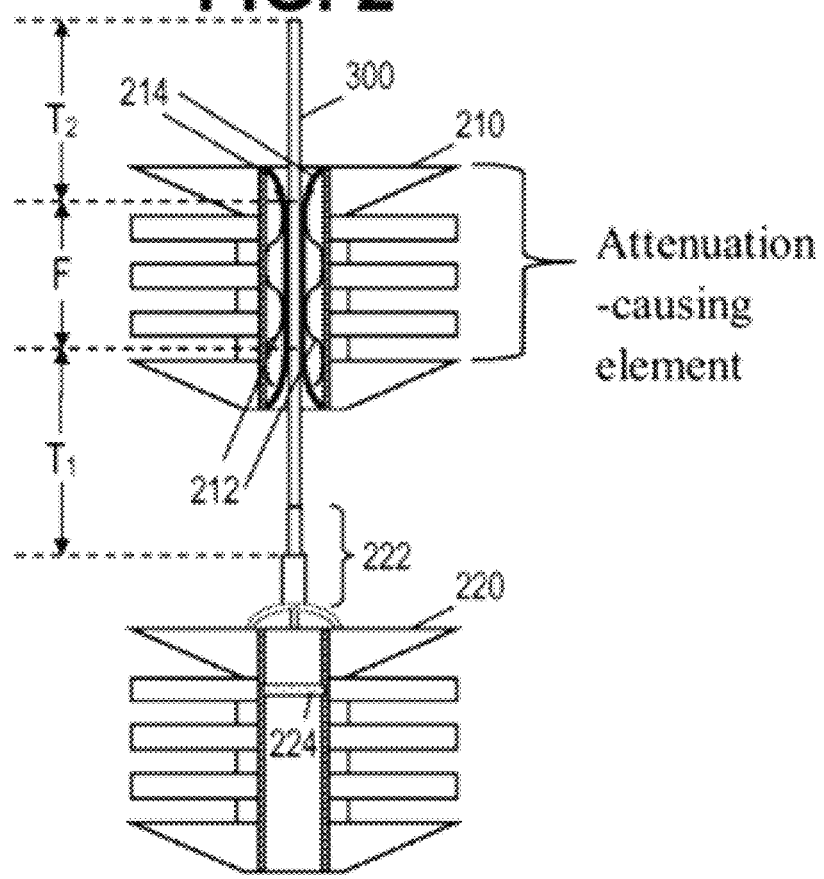
FIG. 2 illustrates example upper and lower plugs coupled to an optical fiber line in accordance with aspects of the present disclosure.

FIG. 2 shows an illustrative upper cementing plug 210 of borehole cementing system 100 that includes one or more attenuation assemblies 214, which can be pressed against optical fiber line 300 by springs 212 to both seal the opening through which optical fiber line 300 passes and to apply a transverse force on the optical fiber line 300. This transverse force produces a change in signal intensity (e.g., loss in dB) along optical fiber line 300 between a segment of optical fiber line 300 above upper cementing plug 210 and a segment of optical fiber line 300 below cementing plug 210. In some implementations, the mechanism for the attenuation of the light signal (e.g., attenuation assembly 214) can microbend or macrobend optical fiber line 300. For example, macrobending can involve bends with curvature radii of the order of 0.5 to 5.0 cm. Forcing optical fiber line 300 into a sinusoidal shape (e.g., using wheels, rollers, or curved surfaces over which optical fiber line 300 can slip) can produce the microbending on optical fiber line 300 that can produce a desired attenuation. In other implementations, radial compression on optical fiber line 400 may introduce microbending (e.g., with radii of curvature or order of the fiber diameter, 1 mm or smaller). Microbending can cause attenuation that increases with radial pressure. In addition to producing attenuation, transverse forces on optical fiber line 300 can introduce friction that affects the tension in optical fiber line 300.

For example, the tensional force along optical fiber line 300 between upper cementing plug 210 and reel 130 (disregarding the cumulative effect of the weight of optical fiber line 300 on its tension) can be expressed as: $T_2 = T_1 + F$ (1), where $T_1$ is the tensional force along optical fiber line 300 between the cementing plugs 210, 220; $T_2$ is the tensional force along optical fiber line 300 above upper cementing plug 210; and F is the frictional force applied by attenuation assemblies 214 of upper cementing plug 210 on optical fiber line 300. Tension variations along optical fiber line 300 can be configured to enhance loss or to not affect loss at attenuation assembly 214. Examples of an attenuation assembly 214 may include a single or multi period sinusoidal bender element or a set of roller wheels. Attenuation assembly 214 may also be spring loaded and/or adjustable for point loss level at a location of attenuation assembly 214.

Continuing to refer to FIG. 2, optical fiber line 300 of borehole cementing system 100 couples to lower cementing plug 220 via detachable coupler 222, which separates into two parts when a tension is applied that exceeds a release tension threshold, allowing optical fiber line 300 to be retrieved after the cement slurry 154 has been deployed into its target location, as described in more detail below. Lower cementing plug 220 also includes rupture disk 224, which is ruptured to open a path for the cement slurry 154 to pass through after lower cementing plug 220 reaches its target position.

Figure 3:
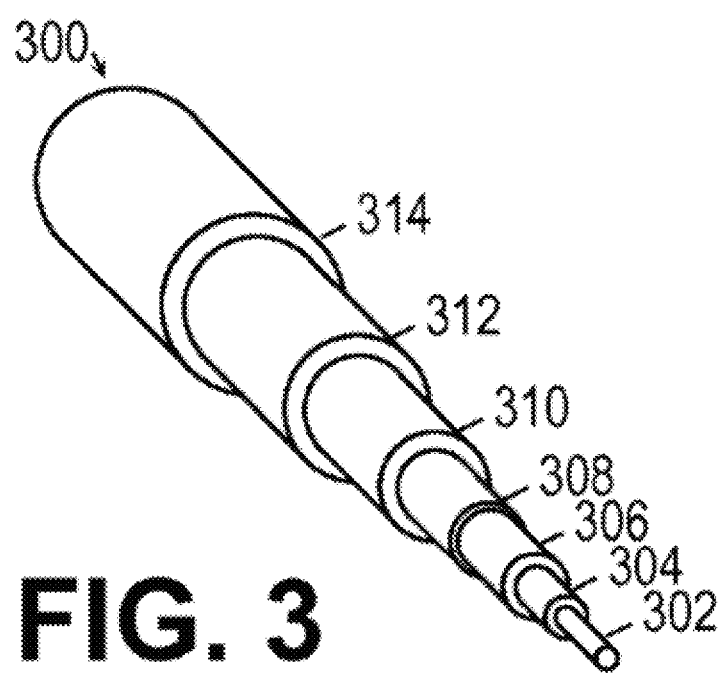
FIG. 3 illustrates an example optical fiber line construction in accordance with aspects of the present disclosure.

During the deployment of the cementing plugs 210, 220, a significant amount of force is applied to the optical fiber line 300 of borehole cementing system 100. FIG. 3 shows an illustrative optical fiber line 300 of borehole cementing system 100 designed to tolerate such forces, as well as the overall hostile environment generally encountered downhole. Optical fiber line 300 includes one or more optical fiber cores 302 within cladding layers 304 having a higher refraction index to contain light within the core. A buffer layer 306, barrier layer 308, armor layer 310, inner jacket layer 312, and an outer jacket 314 may surround the core and cladding to provide strength and protection against damage from various downhole hazards including moisture, hydrogen (or other chemical) invasion, and the physical abuse that may be encountered in a downhole environment. Other illustrative optical fiber lines (not shown) include additional reinforcing fiber lines and/or jackets made from materials such as steel or Kevlar that enable the fiber lines to be subjected to significantly higher stresses than fiber lines without such reinforcement.

As previously noted, time-gated reflected optical pulses (e.g., signal intensity) received from optical fiber line 300 can be converted to electrical signals and forwarded by optical time-domain reflectometer 114 of FIG. 1 for processing by software executing on processing system 116. In at least some embodiments, the software identifies the various types and patterns of signal intensity detected and derives a measurement of the loss dB present along optical fiber line 300. For example, by identifying and quantifying the level of loss dB based on the signal intensity measured by optical time-domain reflectometer 114. Similar measurements can be made using optical frequency-domain reflectometry.

As the process of deploying the cementing plugs 210, 220 and injecting the various fluids and cement slurry 154 proceeds with borehole cementing system 100, the overall loss dB profile derived from the data provided by optical time-domain reflectometer 114 may be used to track the positions of the cementing plugs 210, 220 and the cement slurry 154, as shown in the illustrative embodiment of FIGS. 4A through 4E. In at least some illustrative embodiments, the reflected light pulses can also be utilized to confirm the length of the deployed optical fiber line 300 by utilizing temperature distribution along the optical fiber line 300. The total length of optical fiber line 300 interrogated can remain constant, but as more of optical fiber line 300 is deployed, a longer section is subjected to the borehole environment, which can be assessed by the temperature profile along optical fiber line 300.

FIG. 4A illustrates a simplified casing 106 with lower cementing plug 220 deployed in borehole cementing system 100. Lower cementing plug 220, which is attached to the end of optical fiber line 300, is deployed into casing 106 and forced down casing 106 by cement slurry 154 that is injected into casing 106. Lower cementing plug 220, in turn, pushes spacer fluid 152 down through casing 106 while also pulling optical fiber line 300 down through casing 106. Tension is maintained along optical fiber line 300 by equipment on the surface (e.g., by reel 130 and deployment controller 132 of FIG. 1), which also tracks the deployed length of optical fiber line 300. The resulting signal intensity profile (e.g., loss dB) is shown in the graph of FIG. 4A for this stage of the cementing operation and relatively increases along the length of optical fiber line 300.

In some implementations, as lower cementing plug 220 of borehole cementing system 100 is deployed downhole (e.g., being pushed down by cement slurry 154), lower cementing plug 220 pulls optical fiber line 300 with it. At the surface, the spool release mechanism 130 can be adjusted to maintain a certain minimum tension in optical fiber line 300 to minimize strain elongation error in the surface counter measurement. The length of deployed optical fiber line 300 can accurately be determined by of borehole cementing system 100 and/or by optical time-domain reflectometer 114, which can also measure the distance between the end of optical fiber line 300 and the well head loss point along optical fiber line 300. Utilized this data, borehole cementing system 100 can determine the position of lower cementing plug 220.

FIG. 4B illustrates casing 106 of borehole cementing system 100 after the injection of cement slurry 154 has completed. Upper cementing plug 210 of borehole cementing system 100 has been deployed and the injection of spacer fluid 152 above upper cementing plug 210 has commenced. As previously noted, upper cementing plug 210 can be slidably attached to optical fiber line 300. For example, upper cementing plug 210 can be slidably attached utilizing frictional coupler 222 as illustrated in FIG. 2. At this stage of the cementing operation the injection of spacer fluid 152 above upper cementing plug 210 exerts force on upper cementing plug 210, which exerts force on cement slurry 154, which in turn exerts a force on lower cementing plug 220.

For an illustrative embodiment that incorporates the upper cementing plug 210 shown in FIG. 2, optical fiber line 300, whose tension at the surface is maintained by deployment controller 132, is introduced into the well while being carried by lower cementing plug 220. Attenuation assembly 214, when deployed on upper cementing plug 210, produces attenuation in optical fiber line 300, illustrated as a sharp increase in the loss (e.g., in dB) displayed in the OTDR trace along optical fiber line 300, as illustrated in the graph of FIG. 4B. FIG. 4B further illustrates the depth of a detectable feature 400 of the signal intensity (e.g., loss dB) versus position along optical fiber line 300, and also tracks the position of optical fiber line 300 in the wellbore (e.g., depth profile) based on the known position of lower cementing plug 220, which may be inferred from the tracking of the amount of optical fiber line 300 that is deployed using, for example, counter 136.

In some implementations, detectable feature 400 of borehole cementing system 100 appears in the signal intensity profile as a sharp increase in the measured loss dB of optical fiber line 300. In other illustrative embodiments, detectable feature 400 of borehole cementing system 100 may appear as a ramp in the intensity of the backscattered light (e.g., Rayleigh scattering). Such ramps can be induced by structures within upper cementing plug 210 that pinch optical fiber line 300, or that introduce deviations in optical fiber line 300 (e.g., an s-shaped curve at or near the bend radius of optical fiber line 300). Many other types of detectable features and structures within upper cementing plug 210 for producing such detectable features will become apparent to those of ordinary skill in the art, and all such detectable features and structures are within the scope of the present disclosure.

As cementing plugs 210, 220 of borehole cementing system 100 move downhole, so does detectable feature 400. The position of detectable feature 400 along optical fiber line 300 can be tracked by the software executing on processing system 116 of FIG. 1. The position of detectable feature 400, shown in FIG. 4B as a depth within the borehole, reflects the depth of upper cementing plug 210, which together with the known length of the deployed optical fiber line 300 enables the determination and tracking of the depth within the borehole of lower cementing plug 220, and thus, of the start and end depths of cement slurry 154. In at least some illustrative embodiments, these positions are presented to a user of the system in real-time as the cementing operation proceeds.

The volume of the cement slurry between upper cementing plug 210 and lower cementing plug 220 of borehole cementing system 100 may also be derived from the relative positions of cementing plugs 210, 220 and tracked as cementing plugs 210, 220 and cement slurry 154 move downhole. Such tracking may be used, for example, to detect an increase in the volume between cementing plugs 210, 220 that may indicate an undesired incursion of spacer fluid 152 past lower cementing plug 220 into cement slurry 154. Based upon the estimated degree of contamination of cementing slurry 154, a decision can be made whether to abort the cementing operation while it is still possible to do so. In at least some illustrative embodiments, attached optical fiber line 300 can be used to pull back lower cementing plug 220, the contaminated slurry 154 between cementing plugs 210, 220, and upper cementing plug 210. In such an embodiment, the force used to withdraw cementing plugs 210, 220 and cementing slurry 154 can be maintained below the force needed to detach optical fiber line 300 from lower cementing plug 220.

In some implementations, after the desired volume of cement slurry 154 is pumped, the upper cementing plug 210 can be launched. Upper cementing plug 210 can be connected to optical fiber line 300 by a slidable attenuation assembly 214 that causes attenuation in optical fiber line 300 while allowing relative motion of optical fiber line 300 with upper cementing plug 210. This attenuation need not be applied before upper cementing plug 210 is launched, so upper cementing plug 210 may incorporate a mechanism to hold attenuation assembly 214 away from optical fiber line 300 until upper cementing plug 210 is launched. The applied attenuation from attenuation assembly 214 may be sufficiently large and a detectable attenuation that can be seen or determined by optical fiber line 300 as measured by optical time-domain reflectometer 114. In some instances, at the well head, borehole cementing system 100 can control the tension of optical fiber line 300 with spool release mechanism (e.g., reel 130) to be sufficiently large such that optical fiber line 300 between cementing plugs 210, 220 is also in tension and kept straight such that its length is representative of the distance between upper cementing plug 210 and lower cementing plug 220. This distance can be determined to be the length between the end of optical fiber line 300 and the attenuation drop, as illustrated in the OTDR-measured fiber loss profile shown in FIG. 4B. This also provides the position of upper cementing plug 210 relative to lower cementing plug 220 at the end of optical fiber line 300.

Eventually, lower cementing plug 220 reaches float collar 156, which stops lower cementing plug 220 from moving any further down casing 106 and also causes a reduction in the tension present along optical fiber line 300, as shown in the loss dB profile graph of FIG. 4C. Once cement slurry 154 begins to flow through lower cementing plug 220 (e.g., by increasing the spacer fluid pressure behind upper cementing plug 210 until rupture disk 224 of FIG. 2 ruptures), upper cementing plug 210 begins to move relative to optical fiber line 300, as shown by the dashed outline of upper cementing plug 210 and of the corresponding detectable feature 400. In at least some embodiments, detectable feature 400 (e.g., the aforementioned loss dB differential) still exists and can continued to be tracked and presented to the user because of the attenuation still applied to optical fiber line 300. As illustrated in FIG. 4C, as upper cementing plug 210 extends further downhole, the corresponding detectable feature 400 also moves further downhole, providing borehole cementing system 100 with an accurate representation of the position of upper cementing plug 210.

In some implementations, when bottom cementing plug 220 of borehole cementing system 100 reaches its final downhole position, reel 130 of borehole cementing system 100 can cease rotating at the surface. For example, the motion of lowering lower cementing plug 220 can be determined by the pulling action of fiber optic line 300, which is attached to lower cementing plug 220. Moreover, the attenuation profile (e.g., loss dB profile) measured by optical time-domain reflectometer 114 of borehole cementing system 100 can characterize the position of upper cementing plug 210 by the measured attenuation as upper cementing plug 210 proceeds toward the end of fiber optic line 300, where the lower cementing plug 220 is positioned.

In some instances, the injection of cement slurry 154 through lower cementing plug 220 and out the bottom of casing 106 continues as upper cementing plug 210 travels down casing 106 until upper cementing plug 210 reaches and is stopped by lower cementing plug 220, as shown in FIG. 4D. At this point of the cementing operation, detectable feature 400 is no longer visible and the attenuation profile (e.g., loss dB) of FIG. 4D shows a uniform attenuation (e.g., signal intensity) distribution along the length of optical fiber line 300. The loss dB experienced by optical fiber line 300 also increases from the end of optical fiber line 300 to the surface. In other instances, the tension is increased beyond a release tension threshold and optical fiber line 300 detaches from lower cementing plug 220 (e.g., at detachable coupler 222 of FIG. 2). The increase in tension can be achieved without cementing plugs 210, 220 moving from their positions by maintaining fluid pressure above upper cementing plug 210. Alternatively, a clamp mechanism can be implemented in float collar 156 to lock lower cementing plug 220 in place when it reaches its landed position. In some cases, additional fiber length can be present inside lower cementing plug 220 so that detectable feature 400 does not disappear when upper cementing plug 210 reaches lower cementing plug 220, rather the position of detectable feature 400 reaches the position in the OTDR plot that corresponds to the beginning of where the extra fiber stored in lower cementing plug 220 is located.

At the end of the cementing process, upper cementing plug 210 can be positioned adjacent (e.g., landed) to lower cementing plug 220. At this instance, the measured attenuation by optical time-domain reflectometer 114 of borehole cementing system 100 may not be detectable (unless an additional "dummy" fiber coil with known fiber length is present in lower cementing plug 220 to reduce ambiguity with the attenuation measurement). In other instances, cement slurry 154 has been deployed and the data acquired by optical time-domain reflectometer 114. Borehole cementing system 100 can then utilize the measured data received from optical time-domain reflectometer 114 to confirm the successful deployment of cementing plugs 210, 220 and cement slurry 154, or indicate a problem. For example, if mixed fluids have migrated between upper cementing plug 210 and lower cementing plug 220, the distance between upper cementing plug 210 and lower cementing plug 220 will increase over time as cementing plugs 210, 220 travel down casing 106. This can also be determined and illustrated from the data collected by optical time-domain reflectometer 114.

Once detached as shown in FIG. 4E, optical fiber line 300 of borehole cementing system 100 can be retrieved, thereby completing the cementing operation. In still other illustrative embodiments where lower cementing plug 220 is not locked into place, a force below that required to detach optical fiber line 300 from lower cementing plug 220 is applied, enabling the retrieval of both cementing plugs 210, 220 together with optical fiber line 300.

In some implementations, after cement slurry 154 has been deployed by borehole cementing system 100, the optical fiber line 300 can be retrieved by maintaining pressure in a drill pipe while applying a strong reverse winding pull to reel 130 (e.g., spool). A release mechanism (e.g., deployment controller) can be utilized along with lower cementing plug 220 that can release (e.g., break free) fiber optic line 300. The release mechanism can produce a section of fiber optic line 300 with a diameter such that fiber optic line 300 can pass through upper cementing plug 210.

In other implementations, optical fiber line 300 can pass through a mechanism within an upper inner dart similar to that shown within upper cementing plug 210 of FIG. 2, which can be secured at the surface until the desired amount of cement slurry 154 has been injected at the sea surface (i.e., at the rig and through the pipe leading to the subsea wellhead). The upper inner dart can be deployed behind cement slurry 154 in the same manner as previously described for upper cementing plug 210. When the upper inner dart reaches the upper outer ring at the subsea wellhead, the upper inner dart can be coupled to and seal against the upper outer ring to form upper cementing plug 210, which can continue to be forced downhole by spacer fluid 152 behind it, as previously described. In some implementations, darts and cementing plugs 210, 220 can be equipped with various tools in communication with the surface and borehole cementing system 100. For example, borehole cementing system 100 can further include a casing collar locator or ultrasonic cement bond logging unit, so that additional measurements can be made while deploying or retrieving the dart or cementing plugs 210, 220.

In some implementations, borehole cementing system 100 can include tracking the positions of cementing plugs 210, 220 during cementing operations using optical time-domain reflectometry (e.g., optical time-domain reflectometer 114). Optical time-domain reflectometer 114 of borehole cementing system 100 can provide distributed signal intensity measurements to borehole cementing system 100. For example, optical time-domain reflectometer 114 can measure signal intensity along optical fiber line 300 and provide corresponding data to borehole cementing system 100. Thereafter, borehole cementing system 100 can generate signal intensity profiles (e.g., as shown in FIGS. 4A-4E) relating to loss dB.

In other implementations, signal intensity can be determined along optical fiber line 300 with optical time-domain reflectometer 114 of borehole cementing system 100. As shown in FIGS. 4A-4E, the portion of optical fiber line 300 with the lowest loss dB can correspond to the end or tip of optical fiber line 300 that is attached to lower cementing plug 220. Gradually, the loss dB increases along optical fiber line 300 up towards the surface. As described herein, detectable feature 400 can indicate the position of upper cementing plug 210 by utilizing attenuation assembly 214. Attenuation assembly 214 of borehole cementing system 100 can provide the interference necessary to increase the loss of dB, which indicates the position of upper cementing plug 210.

Optical time-domain reflectometer 114 can further measure signal intensity (e.g., loss dB) at each segment of optical fiber line 300. Thereafter, borehole cementing system 100 can plot each segment of optical fiber line 300 as depth versus loss dB, as illustrated in FIGS. 4A-4E. For example, a large negative slope may represent more loss in dB. In some instances, borehole cementing system 100 may include an optical frequency-domain reflectometer in place of optical time-domain reflectometer 114 to determine changes in phase, signal intensity, or any other parameter suitable for the intended purpose and understood by a person of ordinary skill in the art. In some implementations, instead of a Rayleigh OTDR, Brillouin and Raman backscatter OTDR instruments can detect fiber strain and temperature along optical fiber line 300. In the case of the Brillouin OTDR (BOTDR) and Raman OTDR, fiber strain and temperature changes can be detected along optical fiber line 300. If the deformation apparatus (e.g., attenuation assembly 214) is moving along optical fiber line 300 or a deformed fiber line is translating past the deformation apparatus, fiber bending strain and temperature changes imparted by the deformation apparatus can also be detected, located, and/or ranged.

In some implementations, attenuation assembly 214 generates the attenuation in optical fiber line 300, which can then be detected by optical time-domain reflectometer 114. For example, borehole cementing system 100 can send a light pulse through optical time-domain reflectometer 114 and measure the time it takes for the light pulse to come back to optical time-domain reflectometer 114 from the backscatter of optical fiber line 300. As such, the light pulse that extends to the end of optical fiber line 300 can take the longest amount of time as it has the longer path of travel. Loss of dB may also naturally be occur along optical fiber line 300. As such in FIGS. 4A-4E, the loss of dB slowly increases, and rapidly increases when interference (e.g., detectable feature 400) is encountered. In some implementations, borehole cementing system 100 can approximate bend-induced loss by determining a numerical aperture (NA) of optical fiber line, a radius of curvature of the deformer element (e.g., attenuation assembly 214), and an optical interrogation wavelength of the instrument. By utilizing a single mode fiber line with an NA of 0.12, a 90-degree macrobend with a radius of 0.5 inch that can generate about 0.05 dB loss at 1550 nm. However, at a bend radius of about 0.4 inch, the bend loss over the same 90-degree bend length might be closer to 1 dB at 1550 nm. At a shorter wavelength of approximately 1310 nm, these losses may be so small as to be indetectable. As such, longer wavelengths may be preferred to maximize the bend radius as to not induce excess bend stress in a glass fiber (e.g., optical fiber line 300), which can cause glass fracture-induced failures.

In other implementations, upper cementing plug 210 can include an aperture that allows optical fiber line 300 to travel through upper cementing plug 210. As described herein, upper cementing plug 210 can include an attenuation assembly 214. Examples of attenuation assembly 214 include a squeegee, rollers, undulations, or any other type of attenuation producing device that may macrobend or microbend an optical fiber line. In other instances optical fiber line 300 may be attached to lower cementing plug 220 via a dart, as described herein. The dart may also be detachable such that the dart is detachable from lower cementing plug 200. The detachable feature of the dart may include pressure enabled detachment, mechanical releases, or any other method of detachment suitable for the intended purpose and understood by a person of ordinary skill in the art.

Borehole cementing system 100 can also measure the length of optical fiber line 300 that is inserted into borehole 102 via counter 136, and the light intensity for each segment of optical fiber line 300 via optical time-domain reflectometer 114. Both measurements of length of optical fiber line 300 and light intensity (e.g., loss dB) determined by borehole cementing system 100 can be utilized to generate light/signal intensity profiles. The light/signal intensity profiles can then be utilized by borehole cementing system 100 to determine the position of cementing plugs 210, 220 during the cementing process. Sudden changes in signal intensity (e.g., loss dB) such as detectable features 400 can indicate location of upper cementing plug 210. The sudden changes can be illustrated as ramps in the signal intensity profiles of loss dB versus depth. Furthermore, the sudden changes in signal intensity (e.g., detectable features 400) can be detected in real-time continuously to show changing positions of upper cementing plug 210, as shown in FIG. 4C. As described herein, the sudden changes in signal intensity (e.g., detectable features 400) can be emphasized and enlarged utilizing devices and/or physical structures that instigate attenuation such as attenuation assembly 214.

Figure 5:
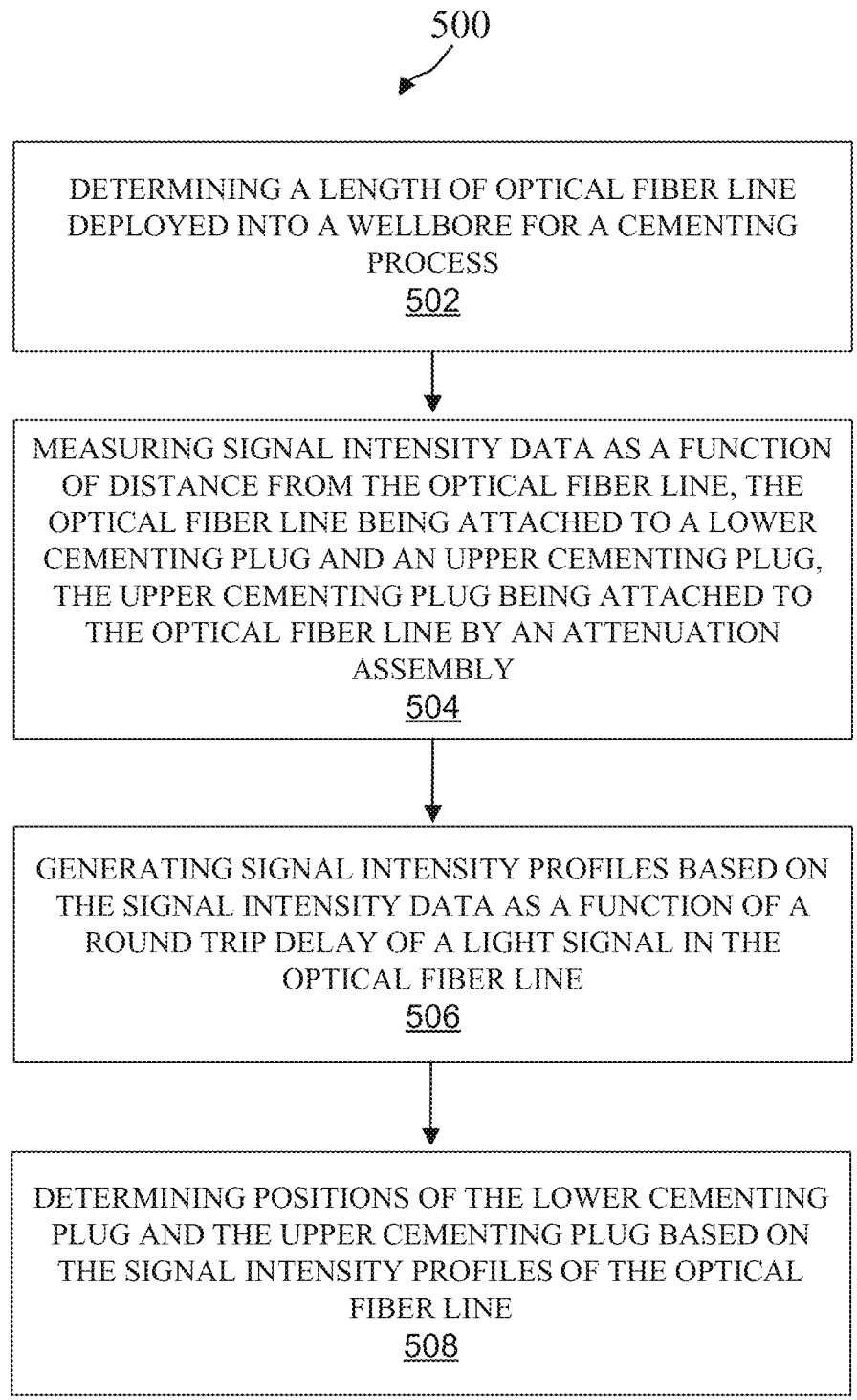
FIG. 5 shows an example process for determining positions of cementing plugs with optical time-domain reflectometry in accordance with aspects of the present disclosure.

Having disclosed some example system components and concepts, the disclosure now turns to FIG. 5, which illustrate example method 500 for determining positions of cementing plugs with optical time-domain reflectometry. The steps outlined herein are exemplary and can be implemented in any combination thereof, including combinations that exclude, add, or modify certain steps.

At step 502, the method 500 can include determining a length of an optical fiber line deployed into a wellbore for a cementing process. The optical fiber line can be a distributed sensing optical fiber line.

At step 504, the method 500 can include measuring signal intensity data as a function of distance from the optical fiber line, the optical fiber line being attached to a lower cementing plug and an upper cementing plug, the upper cementing plug being attached to the optical fiber line by an attenuation assembly. The signal intensity data from the optical fiber line can include loss data measured in linear or logarithmic decibel (dB) units, as experienced by the optical fiber line. The optical fiber line can be attached to the lower cementing plug by a detachable dart. The attenuation assembly can physically couple the upper cementing plug and the optical fiber line, thereby inducing bending and increasing loss of signal intensity in the optical fiber line. The measuring of the signal intensity data from the optical fiber line can be measured by an optical time-domain reflectometer.

At step 506, the method 500 can include generating signal intensity profiles based on the signal intensity data as a function of a round trip delay of a light signal in the optical fiber line.

At step 508, the method 500 can include determining positions of the lower cementing plug and the upper cementing plug based on the signal intensity profiles of the optical fiber line. The determining of the positions of the lower cementing plug and the upper cementing plug can include determining detectable features in the signal intensity profiles caused by the attenuation assembly.

Figure 6:
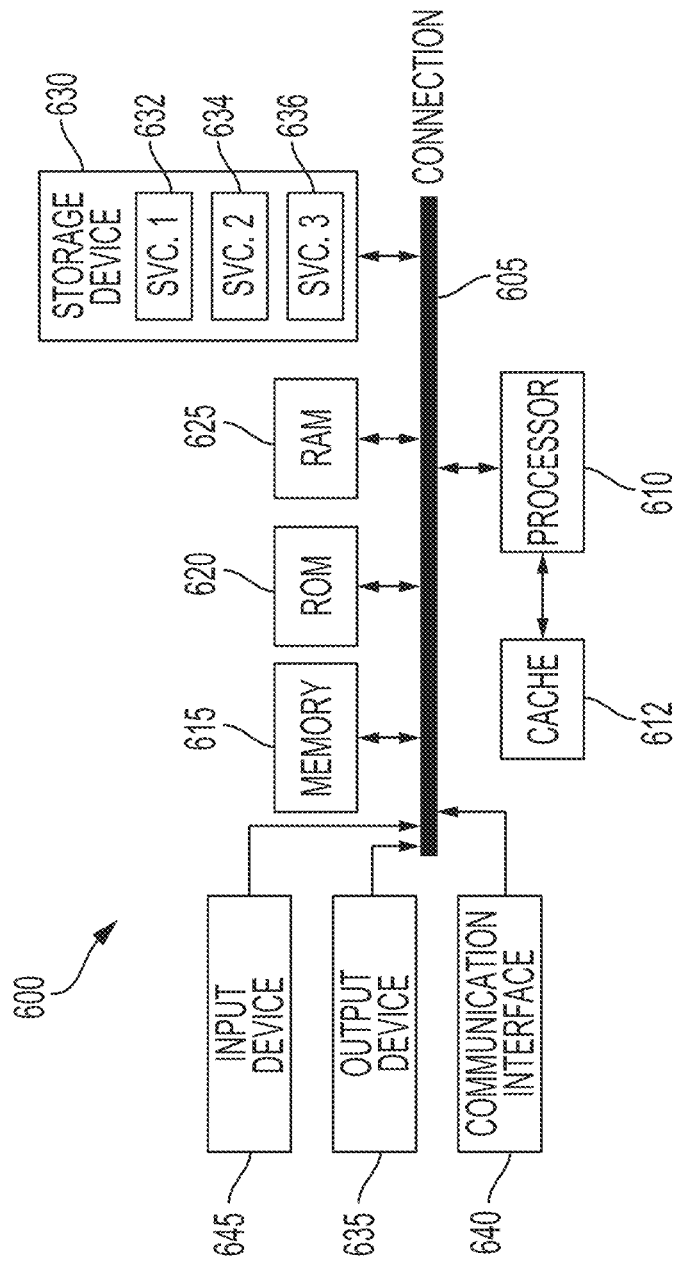
FIG. 6 shows an example computing device architecture which can be employed to perform various steps, methods, and techniques disclosed herein.

FIG. 6 illustrates an example computing device architecture 600 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 6 illustrates an example computing device architecture 600 of a computing device which can implement the various technologies and techniques described herein. The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the processor design. The processor 610 may be a self-contained system, containing multiple cores or processors, a bus, memory controller, cache, etc. A multi-core processor may be symmetric or asymmetric.

To enable user interaction with the computing device architecture 600, an input device 645 can represent any number of input mechanisms, such as a microphone for speech, a touch-sensitive screen for gesture or grail input, keyboard, mouse, motion input, speech and so forth. An output device 635 can also be one or more of a number of output mechanisms known to those of skill in the art, such as a display, projector, television, speaker device, etc. In some instances, multimodal computing devices can enable a user to provide multiple types of input to communicate with the computing device architecture 600. The communications interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include services 632, 634, 636 for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising: determining a length of an optical fiber line deployed into a wellbore for a cementing process, measuring signal intensity data as a function of distance from the optical fiber line, the optical fiber line being attached to a lower cementing plug and an upper cementing plug, the upper cementing plug being attached to the optical fiber line by an attenuation assembly, generating signal intensity profiles based on the signal intensity data as a function of a round trip delay of a light signal in the optical fiber line, and determining positions of the lower cementing plug and the upper cementing plug based on the signal intensity profiles of the optical fiber line.

Statement 2: A method according to Statement 1, wherein the signal intensity data from the optical fiber line includes loss data measured in linear or logarithmic decibel (dB) units, as experienced by the optical fiber line.

Statement 3: A method according to any of Statements 1 and 2, wherein the optical fiber line is a distributed sensing optical fiber line.

Statement 4: A method according to any of Statements 1 through 3, wherein the optical fiber line is attached to the lower cementing plug by a detachable dart.

Statement 5: A method according to any of Statements 1 through 4, wherein the attenuation assembly physically couples the upper cementing plug and the optical fiber line, thereby inducing bending and increasing loss of signal intensity in the optical fiber line.

Statement 6: A method according to any of Statements 1 through 5, wherein the measuring of the signal intensity data from the optical fiber line is measured by an optical time-domain reflectometer.

Statement 7: A method according to any of Statements 1 through 6, wherein the determining of the positions of the lower cementing plug and the upper cementing plug includes determining detectable features in the signal intensity profiles caused by the attenuation assembly.

Statement 8: A system comprising: one or more processors; and at least one computer-readable storage medium having stored therein instructions which, when executed by the one or more processors, cause the system to: determine a length of an optical fiber line deployed into a wellbore for a cementing process, measure signal intensity data as a function of distance from the optical fiber line, the optical fiber line being attached to a lower cementing plug and an upper cementing plug, the upper cementing plug being attached to the optical fiber line by an attenuation assembly, generate signal intensity profiles based on the signal intensity data as a function of a round trip delay of a light signal in the optical fiber line, and determine positions of the lower cementing plug and the upper cementing plug based on the signal intensity profiles of the optical fiber line.

Statement 9: A system according to Statement 8, wherein the signal intensity data from the optical fiber line includes loss data measured in linear or logarithmic decibel (dB) units, as experienced by the optical fiber line.

Statement 10: A system according to any of Statements 8 and 9, wherein the optical fiber line is a distributed sensing optical fiber line.

Statement 11: A system according to any of Statements 8 through 10, wherein the optical fiber line is attached to the lower cementing plug by a detachable dart.

Statement 12: A system according to any of Statements 8 through 11, wherein the attenuation assembly physically couples the upper cementing plug and the optical fiber line, thereby inducing bending and increasing loss of signal intensity in the optical fiber line.

Statement 13: A system according to any of Statements 8 through 12, wherein the measurement of the signal intensity data from the optical fiber line is measured by an optical time-domain reflectometer.

Statement 14: A system according to any of Statements 8 through 13, wherein the determination of the positions of the lower cementing plug and the upper cementing plug includes determining detectable features in the signal intensity profiles caused by the attenuation assembly.

Statement 15: A non-transitory computer-readable storage medium comprising: instructions stored on the non-transitory computer-readable storage medium, the instructions, when executed by one or more processors, cause the one or more processors to: determine a length of an optical fiber line deployed into a wellbore for a cementing process, measure signal intensity data as a function of distance from the optical fiber line, the optical fiber line being attached to a lower cementing plug and an upper cementing plug, the upper cementing plug being attached to the optical fiber line by an attenuation assembly, generate signal intensity profiles based on the signal intensity data as a function of a round trip delay of a light signal in the optical fiber line, and determine positions of the lower cementing plug and the upper cementing plug based on the signal intensity profiles of the optical fiber line.

Statement 16: A non-transitory computer-readable storage medium according to Statement 15, wherein the signal intensity data from the optical fiber line includes loss data measured in linear or logarithmic decibel (dB) units, as experienced by the optical fiber line.

Statement 17: A non-transitory computer-readable storage medium according to any of Statements 15 and 16, wherein the optical fiber line is a distributed sensing optical fiber line.

Statement 18: A non-transitory computer-readable storage medium according to any of Statements 15 through 17, wherein the attenuation assembly physically couples the upper cementing plug and the optical fiber line, thereby inducing bending and increasing loss of signal intensity in the optical fiber line.

Statement 19: A non-transitory computer-readable storage medium according to any of Statements 15 through 18, wherein the measurement of the signal intensity data from the optical fiber line is measured by an optical time-domain reflectometer.

Statement 20: A non-transitory computer-readable storage medium according to any of Statements 15 through 19, wherein the determination of the positions of the lower cementing plug and the upper cementing plug includes determining detectable features in the signal intensity profiles caused by the attenuation assembly.

What is claimed is:

1. A method comprising:
    determining a length of an optical fiber line deployed into a wellbore for a cementing process;
    measuring signal intensity data as a function of distance from the optical fiber line, the optical fiber line being attached to a lower cementing plug and an upper cementing plug, the upper cementing plug being attached to the optical fiber line by an attenuation assembly;
    generating signal intensity loss profiles based on the signal intensity data comprising measurements of a signal intensity loss during a round trip delay of a light signal in the optical fiber line; and determining positions of the lower cementing plug and the upper cementing plug based on the signal intensity loss profiles of the optical fiber line.

2. The method of claim 1, wherein the signal intensity data from the optical fiber line includes loss data measured in linear or logarithmic decibel (dB) units, as experienced by the optical fiber line.

3. The method of claim 1, wherein the optical fiber line is a distributed sensing optical fiber line.

4. The method of claim 1, wherein the optical fiber line is attached to the lower cementing plug by a detachable dart.

5. The method of claim 1, wherein the attenuation assembly physically couples the upper cementing plug and the optical fiber line, thereby inducing bending and increasing loss of signal intensity in the optical fiber line.

6. The method of claim 1, wherein the measuring of the signal intensity data from the optical fiber line is measured by an optical time-domain reflectometer.

7. The method of claim 1, wherein the determining of the positions of the lower cementing plug and the upper cementing plug includes determining detectable features in the signal intensity loss profiles caused by the attenuation assembly.

8. A system comprising:
one or more processors; and
at least one computer-readable storage medium having stored therein instructions which, when executed by the one or more processors, cause the system to:
determine a length of an optical fiber line deployed into a wellbore for a cementing process;
measure signal intensity data as a function of distance from the optical fiber line, the optical fiber line being attached to a lower cementing plug and an upper cementing plug, the upper cementing plug being attached to the optical fiber line by an attenuation assembly;
generate signal intensity loss profiles based on the signal intensity data comprising measurements of a signal intensity loss during a round trip delay of a light signal in the optical fiber line; and
determine positions of the lower cementing plug and the upper cementing plug based on the signal intensity loss profiles of the optical fiber line.

9. The system of claim 8, wherein the signal intensity data from the optical fiber line includes loss data measured in linear or logarithmic decibel (dB) units, as experienced by the optical fiber line.

10. The system of claim 8, wherein the optical fiber line is a distributed sensing optical fiber line.

11. The system of claim 8, wherein the optical fiber line is attached to the lower cementing plug by a detachable dart.

12. The system of claim 8, wherein the attenuation assembly physically couples the upper cementing plug and the optical fiber line, thereby inducing bending and increasing loss of signal intensity in the optical fiber line.

13. The system of claim 8, wherein the measurement of the signal intensity data from the optical fiber line is measured by an optical time-domain reflectometer.

14. The system of claim 8, wherein the determination of the positions of the lower cementing plug and the upper cementing plug includes determining detectable features in the signal intensity loss profiles caused by the attenuation assembly.

15. A non-transitory computer-readable storage medium comprising:
instructions stored on the non-transitory computer-readable storage medium, the instructions, when executed by one or more processors, cause the one or more processors to:
determine a length of an optical fiber line deployed into a wellbore for a cementing process;
measure signal intensity data as a function of distance from the optical fiber line, the optical fiber line being attached to a lower cementing plug and an upper cementing plug, the upper cementing plug being attached to the optical fiber line by an attenuation assembly;
generate signal intensity loss profiles based on the signal intensity data comprising measurements of a signal intensity loss during a round trip delay of a light signal in the optical fiber line; and
determine positions of the lower cementing plug and the upper cementing plug based on the signal intensity loss profiles of the optical fiber line.

16. The non-transitory computer-readable storage medium of claim 15, wherein the signal intensity data from the optical fiber line includes loss data measured in linear or logarithmic decibel (dB) units, as experienced by the optical fiber line.

17. The non-transitory computer-readable storage medium of claim 15, wherein the optical fiber line is a distributed sensing optical fiber line.

18. The non-transitory computer-readable storage medium of claim 15, wherein the attenuation assembly physically couples the upper cementing plug and the optical fiber line, thereby inducing bending and increasing loss of signal intensity in the optical fiber line.

19. The non-transitory computer-readable storage medium of claim 15, wherein the measurement of the signal intensity data from the optical fiber line is measured by an optical time-domain reflectometer.

20. The non-transitory computer-readable storage medium of claim 15, wherein the determination of the positions of the lower cementing plug and the upper cementing plug includes determining detectable features in the signal intensity loss profiles caused by the attenuation assembly.

* * * * *